Patented Aug. 30, 1932

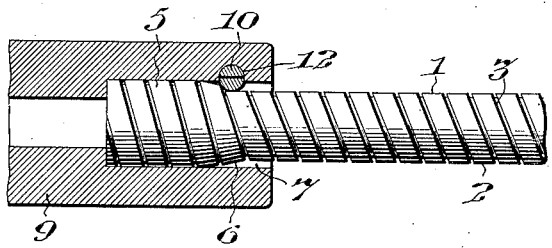
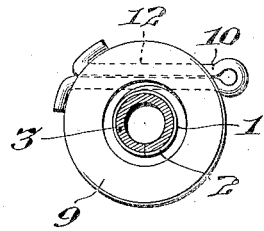
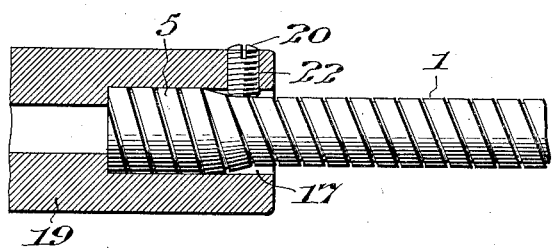
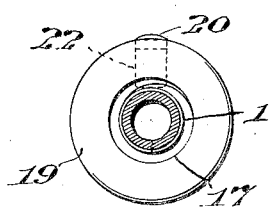
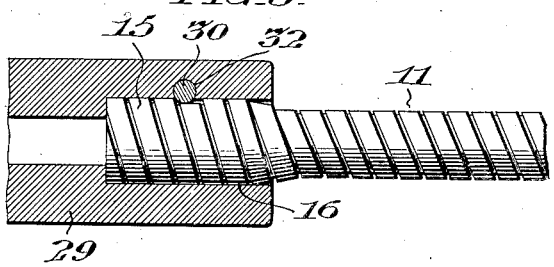
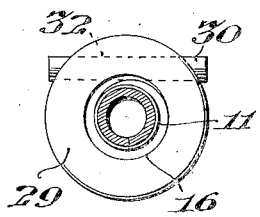
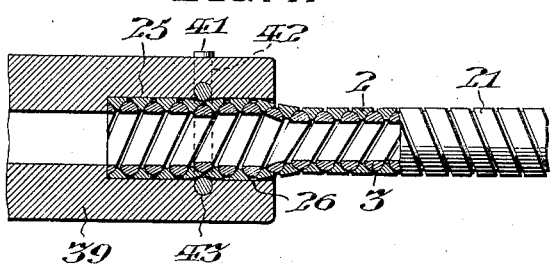
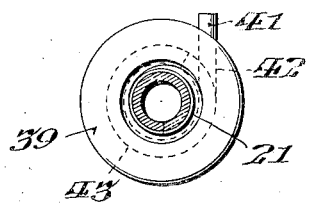

1,874,397

UNITED STATES PATENT OFFICE

HARTWELL W. WEBB, OF PHILADELPHIA, PENNSYLVANIA, ASSIGNOR TO THE S. S. WHITE DENTAL MANUFACTURING COMPANY, A CORPORATION OF PENNSYLVANIA

FLEXIBLE SHAFT CASING ASSEMBLY

Application filed January 28, 1930. Serial No. 424,105.

My invention relates particularly to the means of attachment of flexible shaft casing terminals to the housings of the flexible shaft driving and driven mechanisms, and is especially directed to the unique formation of said terminals.

It has heretofore been common practice in assembling a flexible shaft casing combination, to connect a driven unit such as a speedometer with a driving unit such as the transmission of an automobile, by attaching to the end of said flexible shaft casing, either by solder or by swaging, a terminal ferrule or collar having a peripheral flange which may be engaged by a sleeve nut arranged to be threadedly engaged with a threaded bearing boss or nipple projecting from the casing of said speedometer and said transmission or other driven and driving units, as may be.

The principal objects of my invention are to provide a flexible shaft casing formed of spirally coiled wire strands and having its terminals so enlarged as to cooperate with retaining means for removably and replaceably engaging it with housings of driving and driven mechanisms which are arranged to be operatively connected by flexible shafting extended through said shaft casing.

Other objects of my invention are to provide a flexible shaft casing which in itself affords means of engagement with cooperative elements without the requirement of the attachment of separately formed parts, and which may be produced at a minimum of expense.

My invention comprehends a flexible shaft casing assembly in which the combination of the shaft casing and cooperative housing elements play an important part in facilitating the convenient removal and replacement of the flexible shaft which may be sheathed thereby, with respect to driving and driven mechanisms that said shaft may connect.

My invention includes a flexible shaft casing formed of a plurality of interfitted coiled wire strands, having its terminal regions enlarged and the uniform thickness of the casing wall maintained throughout its length.

Specifically stated, the form of my invention as hereinafter described comprises, in its preferred embodiment, a flexible shaft casing having its terminals enlarged or expanded to afford a shoulder against which a retaining device such as a pin, screw or other means passing into the bore or socket of the casing terminal receiving element which projects from the housing and provides the bore of entry for the flexible shaft that may be sheathed by said casing.

My invention also includes all of the various novel features of construction and arrangement, as hereinafter more definitely specified.

In the accompanying drawing, Figure 1 is a sectional elevational view of a flexible shaft casing embodying my invention connected with the housing of flexible shafting driven mechanism by a cotter pin engaging the shoulder of the enlarged terminal of said casing; Fig. 2 is a transverse sectional elevational view of the assembly shown in Fig. 1; Fig. 3 is a sectional elevational view of a flexible shaft assembly such as shown in Fig. 1, but embodying a set screw arranged to engage the shoulder of the enlarged casing terminal; Fig. 4 is a transverse sectional elevational view of the casing assembly shown in Fig. 3; Fig. 5 is a sectional elevational view of a flexible shaft casing assembly similar to those shown in Figs. 1 and 3 but embodying a pin slightly displacing one of the strands for the purpose of retaining the casing; Fig. 6 is a transverse sectional elevational view of the structure shown in Fig. 5; Fig. 7 is a sectional elevational view of a casing assembly in which a pin embraces the enlarged terminal of the casing and prevents its displacement by circular distortion; and Fig. 8 is a transverse sectional elevational view of the structure shown in Fig. 7.

In said figures, the flexible shaft casing 1 is formed of wires 2 and 3 of the cross-sectional contour shown in section in Fig. 7, and it has its terminals 5 enlarged to form a shoulder 6 which when entered into the socket 7 in the projection 9 of the housing of any suitable driving or driven mechanism, not shown; said shoulder 6 cooperates with retaining means which, as shown in Figs. 1 and 2, comprises the split cotter pin 10 extended through a suitably disposed transverse aperture 12 in the projection 9 of said housing.

As shown in Figs. 3 and 4, the shaft casing 1 has its enlarged terminal 5 entered into the socket 17 of the housing projection 19 and its shoulder 6 is engaged by the set screw 20 extended through the threaded aperture 22 whereby said flexible shaft casing 1 may be retained in removable and replaceable relation with said projection 19.

As shown in Figs. 5 and 6, the casing 11 has the enlarged terminal 15 and is entered into the socket 16 of the projection 29 and said flexible shaft casing 11 is retained in said socket by the pin 30 extended through the aperture 32 so as to slightly distort one of the strands 2 to prevent displacement of the enlarged terminal 15 of the casing 11 from the socket 16.

As illustrated in Figs. 7 and 8, the casing 21 has its enlarged terminal 25 engaged in the socket 26 of the housing projection 39 which is provided with an aperture 42 merging into a circular groove 43 in the walls of the socket 26, and said flexible shaft casing is retained in said socket 26 by a malleable pin which may be driven into said aperture 42 and groove 43, as indicated, to slightly distort the wall of the enlarged terminal 25 of the flexible shaft casing 21 to prevent its displacement.

It may be here noted that the enlarged terminal of the flexible shaft casing herein shown may be either formed on said casing in the process of coiling the strands together in the fabrication of the casing, or the casing may be made of uniform diameter and its terminal subsequently expanded into the enlarged form illustrated, without altering the thickness of the casing wall.

My invention is advantageous in that the enlarged terminal connecting means is formed unitary with the casing so that the advantage of the continuous coiling of the strands from end to end of the casing is attained and the enlargement utilized to retain the casing in connected relation with the housing without the necessity for a separate soldering or swaging operation in attaching a retaining terminal member on said casing. Furthermore, the uniform thickness of the casing wall may be maintained throughout its length by varying the pitch angle of the strands forming the enlarged region with respect to the pitch angle of the strands forming the intermediate region of said casing.

I do not desire to limit my invention to the precise details of construction and arrangement as herein set forth, as it is obvious that various modifications may be made therein without departing from the essential features of my invention as defined in the appended claims.

Having thus described my invention, I claim:

1. A flexible shaft casing formed of a plurality of wire strands coiled into tubular form and having its terminal coils preformed and permanently set into a greater diameter than its body, whereby a shoulder is formed for cooperation with a coupling means.

2. In a device of the class described, the combination with a flexible shaft casing formed of a plurality of strands coiled into tubular form and having the coils of its terminal regions enlarged, a housing element having a bore arranged to receive said enlarged terminal region and having a transverse aperture intersecting said bore to provide a groove therein, and retaining means removably entered into said aperture and extended through said groove and into said bore in engagement with the coils of said enlarged terminal region to retain the casing terminal in said bore.

3. In a device of the class described, the combination with a rigid casing member having a bore provided with a counterbore affording a shoulder, of a flexible casing formed of a plurality of strands coiled into tubular form and having its terminal regions preformed and permanently set into a greater diameter than its intermediate body, and means extended transversely through said casing member and arranged to retain said enlarged terminal in said counterbore with its end abutted against said shoulder.

In witness whereof, I have hereunto set my hand this 25th day of January, A. D. 1930.

HARTWELL W. WEBB.